United States Patent [19]
Boney et al.

[11] 3,867,103
[45] Feb. 18, 1975

[54] ALKYLATION APPARATUS

[75] Inventors: William G. Boney, Arlington Heights; Paul J. Kuchar, Hinsdale, both of Ill.

[73] Assignee: Universal Oil Products Company, Des Plaines, Ill.

[22] Filed: June 25, 1973

[21] Appl. No.: 373,544

[52] U.S. Cl.............. 23/288 E, 23/283, 23/285, 260/683.48, 260/683.59
[51] Int. Cl.......... B01j 1/00, C07c 3/12, C07c 3/54
[58] Field of Search...... 23/288 E, 288 A, 285, 283; 260/683.48, 683.58, 683.59

[56] References Cited
UNITED STATES PATENTS

| | | |
|---|---|---|
| 1,847,009 | 2/1932 | Kollbohm ........................ 23/285 X |
| 2,381,119 | 8/1945 | Dill................................ 23/288 E X |
| 2,395,777 | 2/1946 | Brunjes et al...................... 23/285 |
| 2,412,863 | 12/1946 | Bolinger et al. ............. 260/683.48 X |

Primary Examiner—Joseph Scovronek
Assistant Examiner—Barry I. Hollander
Attorney, Agent, or Firm—James R. Hoatson, Jr.; Robert W. Erickson; William H. Page, II

[57] ABSTRACT

An apparatus for the catalytic conversion of a hydrocarbon stream with a mineral acid catalyst comprising a vessel divided into an upper and lower chamber by an imperforate plate. The imperforate plate has a plurality of standpipe means connected thereto whereby hydrocarbon can pass into the upper chamber from hydrocarbon inlet means located in the lower chamber. A perforated plate is located in the upper chamber above the imperforate plate having flow guide conduits axially aligned above each of the standpipe means. A catalyst inlet means is located intermediate the imperforate and perforate plates and an emulsion outlet is located in the upper chamber. The flow guide conduits serve to promote eduction of acid-catalyst into the flow guide conduits by a high velocity hydrocarbon stream emitted from openings in said standpipe means, and to contain and confine the hydrocarbon stream and prevent contact of a resulting acid-hydrocarbon emulsion with previously formed emulsion until the hydrocarbons and acid are thoroughly mixed and the hydrocarbons at least partially reacted.

4 Claims, 2 Drawing Figures

ALKYLATION APPARATUS

BACKGROUND OF THE INVENTION

1. Field of the Invention

The field of art to which this invention pertains is that of mineral oil conversion processes and apparatus. In particular, this invention relates to a reactant contacting apparatus and process useful for liquid phase alkylations utilizing hydrofluoric or sulfuric acid as the catalyst.

2. Description of the Prior Art

The great economic importance of alkylation and the large influence on product quality exerted by the method of contacting has led to a great number of designs for contacting apparatus. Some of these designs utilize nozzles to create finer dispersions of reactant droplets or to impart kinetic energy needed to circulate the reactants and acid. Another often described advantage of the nozzle produced dispersion is the ability to use the acid phase as a heat sink. Exemplary of some of these designs are U.S. Pat. Nos. 3,006,739; 3,080,438 (Cl. 260-683.48); 3,133,128 (Cl. 260-683.48); 3,133,128 (cl. 260-683.58); 3,213,157; 3,607,970 and 3,696,168. These references, however, do not discuss the effect on the octane number of the resulting alkylate of varying the relative superficial velocities of the hydrocarbon stream and the catalyst phase when the reaction zone is maintained at the same degree of turbulence. They also do not provide means to maintain different acid to hydrocarbon ratios in reaction and emulsion soaking zones within a single unitary vessel while feeding acid to the vessel at a single controlled rate.

BRIEF SUMMARY OF THE INVENTION

Our invention can be briefly summarized as an apparatus and process for contacting the reactants of an acid-catalyzed alkylation reaction. A hydrocarbon mixture leaving standpipes located in a lower section of the apparatus at a high velocity educts acid situated around the standpipe into guide conduits located directly above the standpipes and which serve to at least partially enclose the reaction zone. In this manner, the hydrocarbon stream has a faster linear velocity than the educted acid at the point of mixing, and this velocity is not rapidly diminished by dispersion of the hydrocarbon stream into the bulk of the acid-catalyst emulsion contained in the apparatus. The acid to hydrocarbon ratio in the guide conduit is maintained in a preferred range less than one to one during the initial reacting of the hydrocarbons. The unitary apparatus then maintains the resulting emulsion in a state of turbulence and at a preferred higher acid to hydrocarbon ratio in a soak zone during the completion of the reaction and defluorination of the product.

A broad embodiment of the apparatus of our invention comprises: (a) a cylindrical receiving vessel having upper and lower enclosed chambers; (b) a hydrocarbon inlet means located on said lower enclosed chamber; (c) an acid-catalyst inlet means located on a lower portion of said upper enclosed chamber; (d) an acid-hydrocarbon emulsion outlet means located on an upper portion of said upper enclosed chamber; (e) a plurality of hydrocarbon standpipe means in communication with said lower enclosed chamber and extending in a vertical direction into said upper enclosed chamber and having an opening on their upper end; and, (f) a plurality of hydrocarbon flow guide conduits, one of which is axially aligned with and located above each of said hydrocarbon standpipe means and extending upwardly within said upper enclosed chamber.

The process of our invention comprises the steps of: (a) passing a non-dispersed high velocity stream of catalyst-free alkylatable hydrocarbons into a reaction vessel maintained at reaction conditions, said hydrocarbon stream being directed into a flow guide conduit means located above the point at which the hydrocarbon stream enters the vessel so to cause aspiration of acid-catalyst contained within a lower portion of the reaction vessel into the flow guide conduit means, said hydrocarbon stream entering the guide conduit at a higher superficial velocity than the educted acid; (b) mixing said hydrocarbon stream and educted acid in said guide conduit means to thereby cause reaction of the alkylatable hydrocarbons and form an acid-hydrocarbon emulsion; and, (c) discharging said acid-hydrocarbon emulsion from the guide conduits and into an upper section of said reaction vessel which contains a large turbulent mass of previously formed emulsion having an overall acid to hydrocarbon ratio greater than one to one to allow the continued reaction of the hydrocarbon stream and the defluorination of the products.

BRIEF DESCRIPTION OF THE DRAWING

A preferred embodiment of our invention is described in the attached

Figure 1:
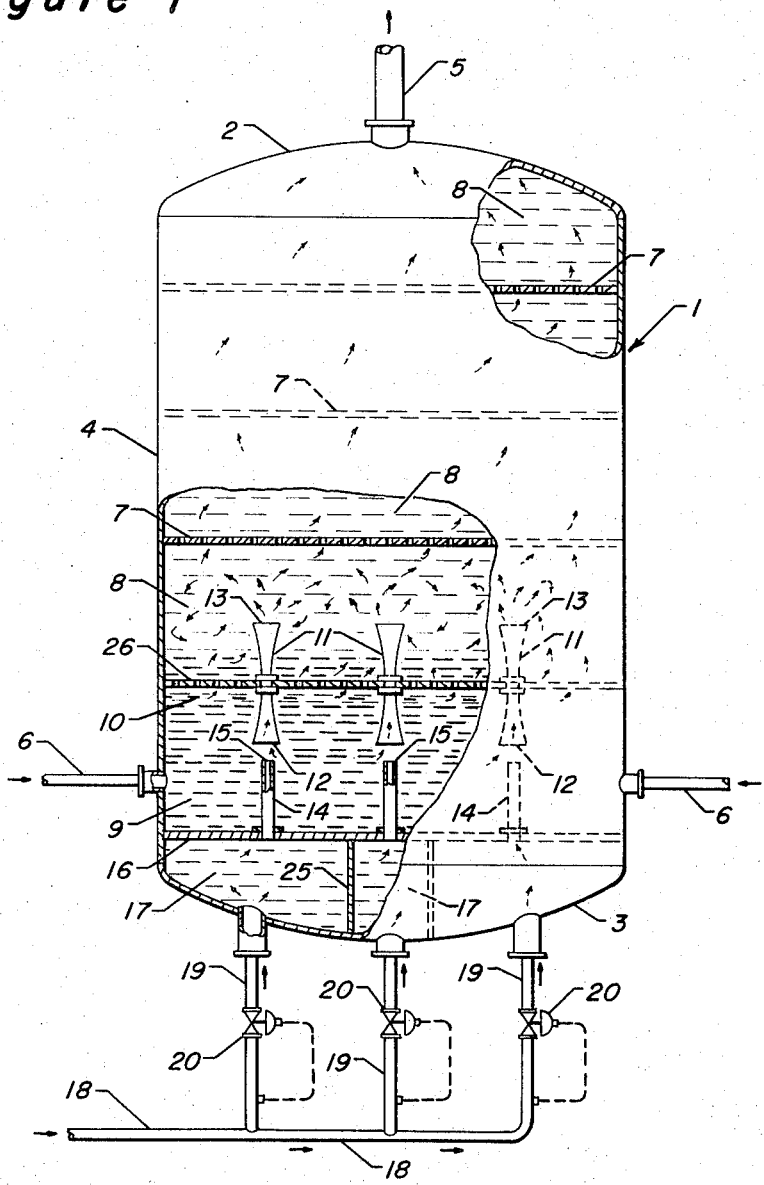
FIG. 1, is a vertical cross-section of an alkylation reactor capable of performing our alkylation process. This drawing is not intended to unduly limit the scope of our claims but is presented as a guide to understanding our invention.

Receiving vessel 1 is shown as a vertically positioned, elongated enclosed cylinder having side walls 4, an upper cap 2 and a lower cap 3. Shown as conduit 5 passing through top cap 2 of the receiving vessel is the emulsion outlet means 5 which can be one or more pipes located at the top or near the top of the receiving vessel to allow passage of emulsion material out of the apparatus. Located within receiving vessel 1 are several flow guide conduits 11, which are shown as vertically positioned venturi nozzles having lower inlets 12 and upper outlets 13. The guide conduits 11 may be venturi shaped in order to promote better mixing of a hydrocarbon stream which leaves standpipes 14 via their outlets 15 with educted acid within the guide conduits to form an emulsion of the hydrocarbon and acid. The acid is drawn up or aspirated from a layer of essentially pure acid 9 located around the outlets 15 of the standpipe conduit 14. The resultant emulsion is ejected from each guide conduit via its outlet 13 and passed into the upper chamber 8 within the vessel. The guide conduits may be secured in place by a perforated plate 26 which allows vertical flow of material through the vessel or may be placed on individual free standing supports.

The emulsion fills that volume of the receiving vessel which is above the acid interface 10. The level of this emulsion will be set by the rate at which acid is charged to the vessel, the location and porosity of any plate such as 26 which crosses the apparatus and the turbulence of the emulsion. The acid is charged at a rate greater than that at which it is aspirated into the guide conduits and the acid rises until it is mixed into the turbulent emulsion. Emulsion mixing means 7 are located above the guide conduit outlets 13 to promote the continued mixing of the emulsion as it passes in an upward direction through the upper chamber until it eventually passes out of the receiving vessel via emulsion outlet conduit 5. The upper chamber serves as a time tank which allows the reactants to "soak" while the reaction is completed and promotes the defluorination of alkylfluorides formed during the alkylation reaction.

Horizontal imperforate plate 16 traverses the lower portion of the receiving vessel thereby dividing the vessel into the upper chamber 8 and a lower chamber 17. The horizontal plate seals the receiving vessel to prevent the passage of any hydrocarbon from the lower chamber 17 into the upper chamber other than via the standpipes 14. The latter are fitted into suitable apertures in plate 16, and affixed to said plate 16 in any appropriate manner, and as indicated in FIG. 1. In a preferred embodiment, the lower chamber 17 is divided as indicated into separate sections by vertical plates 25 which allow individual standpipes to be removed from operation.

As shown in the drawing, line 18 carries an alkylatable hydrocarbon mixture into the lower chamber 17 via header lines 19 at rates controlled by valves 20. The flow rates into the respective sections of the lower chamber and into the standpipes connected thereto may be independently controlled by valves 20. Acid-catalyst inlet means represented by conduits 6 are shown passing into a lower portion of the upper chamber 8. It is preferred that the acid-catalyst charge rate be regulated so that the liquid acid phase 9 has its upper surface, or interface 10 with the emulsion, located at an elevation near the outlets 15 of the standpipes. Accordingly, the inlet conduits 6 are shown passing into the receiving vessel at a point below the uppermost portion of the standpipes 14. In the embodiment depicted, however, the interface is shown closer to plate 26 because of the reduction in the amount of mixing which would accompany the use of a plate. In actuality, there would be no smooth interface during conditions sufficient to mix the acid into the retained emulsion.

A brief description of the flow of the acid-catalyst, hydrocarbon reactants and acid-hydrocarbon emulsion in our invention includes the passages of an alkylatable hydrocarbon mixture via line 18 and conduits 19 at rates controlled by valves 20 into the lower chamber 17 and eventually into standpipes 14 and out of the standpipes via outlets 15. After leaving the standpipes, the hydrocarbon mixture passes into guide conduits 11 through inlets 12 causing aspiration of acid-catalyst which is maintained around the standpipes as represented by liquid acid phase 9 in the drawing. The resulting high velocity reactant mixture passes through guide conduits 11, wherein a majority of the nearly instantaneous reaction is completed, and passes out of outlets 13 into the emulsion contained in the upper chamber 8. The discharge of this high velocity stream into the retained mass of emulsion in the soak zone agitates the emulsion in a whirling action which mixes relatively pure acid passing upward through plate 26 into the emulsion and increases the acid to hydrocarbon ratio present in the soak zone. The emulsion continues to be mixed by passage through emulsion mixing means 7 and eventually exits the apparatus via emulsion outlet 5. Various temperature, pressure, flow rate or other process parameter sensing and regulating means are normally utilized in an apparatus and process such as this. For reasons of simplicity and clarity, they are not depicted as it is considered to be within the knowledge of those skilled in the art to control our process and operate our apparatus.

DETAILED DESCRIPTION OF THE INVENTION

Our invention relates to an apparatus and process for contacting a mixture of olefins and isoparaffins with a protonic acid such as hydrofluoric or sulfuric acid for the purpose of producing an alkylated product. The apparatus essentially comprises a unitary reaction vessel containing a multiplicity of olefin-isoparaffin mixture injection standpipes which individually discharge into the inlets of flow guiding conduits, in which educted acid catalyzes the reaction of the hydrocarbon mixture, and a holding volume located above the conduits.

Alkylatable material which may be charged to our invention includes mixtures of paraffinic or aromatic hydrocarbons with olefinic hydrocarbons. Typical paraffins includes isobutane and higher homologues having a tertiary carbon atom such as 2-methylbutane and 2,4-dimethylpentane. Other alkylatable materials include benzene, toluene, xylene, naphthenes, phenols, cresols, amines, thiophenes and isoparaffinic mercaptans. Typical olefins include ethylene, propylene, butene-1, butene-2, isobutylene, pentenes and hexenes.

The alkylation is promoted through the presence of a mineral acid-catalyst such as hydrofluoric acid, sulfuric acid or phosphoric acid. These acids are maintained in a liquid phase containing a minimum of water to reduce corrosion problems. The catalyst may also comprise a mixture of a mineral acid with a Friedel-Crafts metal halide such as aluminum chloride, aluminum bromide, boron trifluoride and other proton donors. Alkylation conditions in general include a pressure sufficient to maintain the hydrocarbons and acid in a liquid phase, with a general range being from about 50 psig. to 500 psig., and a more preferred range being from 100 psig. to about 250 psig. Although the alkylation reaction occurs at temperatures from about 0°F. to about 200°F., it is preferred to operate our process in the range of about 50°F. to 140°F., with 90°F. being a representative operating temperature.

As known to those skilled in the art, typical alkylation zone conditions include a high ratio of the molar concentration of the paraffin or aromatic present to the olefin present in order to produce a high quality monoalkylate. A broad range of this ratio is from about 6 to about 20 with a preferred operating range being from 8 to 16. A second ratio which often varies in competing alkylation processes is the volumetric ratio of acid to hydrocarbon in the total emulsion formed, that is, the ratio in the material charged to the mixing zone or reaction point. This ratio may vary widely from a high of about 20 to 1 to a low of about 0.5 to 1 and an optimum value will depend on the hydrocarbons charged to the process and other features. When charging isobutane and propylene, it is preferred that our process be operated at an acid to hydrocarbon ratio of from 1 to 1 to about 3 to 1 in the emulsion soaking zone but with a ratio less than 1 to 1 during the initial reaction period.

A general flow of an alkylation process designed for the production of high octane number motor fuel comprises the steps of contacting a mixture of the two hydrocarbons to be reacted with a mineral acid-catalyst, mixing the reactants and the acid to form an emulsion, allowing the emulsion to 'soak' for a length of time during which some agitation or turbulence is maintained to sustain the emulsion, passing the emulsion into a settling zone in which separate liquid acid and hydrocarbon phases form, and withdrawing the separate liquid phases from the settling zone. It is common practice, at this point, to recirculate at least a portion of the acid phase to the reaction or mixing zone or point. This recirculated acid is often cooled so that it functions as a heat sink for the exothermic reaction. Since a large excess of the isoparaffin or aromatic is present in the reactants, this material may be recovered from the separated liquid hydrocarbon phase by such methods as flashing or fractionation and also recirculated to the reaction zone. Some processes do not utilize a soak zone at all and still others contact the separated hydrocarbon phase with a regenerated high strength acid stream to aid in defluorination.

The receiving vessel of our apparatus can be any type of vessel constructed to withstand the pressure, temperature and corrosive conditions of an acid-catalyzed alkylation operation, but is preferably a cylindrical steel vessel being relatively elongated and vertically positioned. The top and bottom walls of the receiving vessel can be flat plates or can be spherically shaped caps. For purposes of description, the receiving vessel may be divided into upper and lower sections, generally equal to the upper and lower half respectively of the vessel. Preferably, however, the upper section comprises the upper quarter of the vessel while the lower section comprises the lower quarter of the vessel. The fluid standpipe inlet means are preferably vertically positioned tubes which are located in the lower section of the receiving vessel so that their respective outlets discharge a nondispersed high velocity stream of unreacted hydrocarbons in an upward direction. In one embodiment, the fluid standpipe can be one or more vertical small diameter pipes which pass through a lower section of the receiving vessel and are connected to a manifold arrangement used for distribution of the hydrocarbon through the standpipes. The standpipe may have a nozzle located on its outlet, and more than one standpipe is preferably utilized.

In a more limited embodiment, a horizontal imperforate plate (16) is located within the lower section of the receiving vessel to separate the vessel into an upper emulsion chamber or volume and a lower inventory chamber or volume. The purpose of the horizontal plate is to support the fluid standpipes connected to the horizontal plate and to isolate the hydrocarbons within the inventory chamber or volume from the acid in the upper emulsion chamber. The upper chamber will comprise the entire volume within the receiving vessel in instances in which the horizontal plate 16 is not utilized. In such instances, the standpipes which carry the first fluid into the receiving vessel will still be vertically positioned and may be connected to a manifold which is located within the chamber. In cases where the horizontal plate 16 is utilized, the upper chamber is the volume within the receiving vessel above that plate and the inventory or lower chamber is located below the plate and within the receiving vessel.

It is preferred that the hydrocarbon inlet means pass through the bottom of the receiving vessel to deliver the hydrocarbons to a compartmentalized lower chamber, but these inlet conduits or pipes may extend into the vessel and connect directly to the inlets of the standpipes or be the standpipes themselves. The compartmentalization of the lower chamber serves to ensure a more uniformly mixed supply of the reactants without the use of obstructions in the pipes which result in utility consuming pressure drops.

Placed immediately above each of the standpipes is a guide conduit means, preferably a venturi, to cause the material which leaves the standpipes to pass into the conduits and cause aspiration into the conduits of acid material located in the bottom of the emulsion chamber. An emulsion is formed in the conduit and passed into the emulsion chamber for further mixing and reaction. The guide conduits are preferably of a venturi shape, but may be cylindrical pipes or square or conical tubing as long as the fluid dynamics will cause the hydrocarbon passing from the standpipe into the flow guide to draw up acid from the acid phase located around the outlet of the standpipe. This apparatus allows the hydrocarbons entering the receiving vessel through the standpipe to always have a higher velocity than the acid prior to their initial mixing and reaction in the reactant flow guides conduits. It is preferred that the emulsion leaving the guide conduits contact emulsion mixing means such as perforated plates, trays, screens, or suitably designed decks which will promote the maintenance of the emulsion as an aid to the completion of alkylation and defluorination. The emulsion in the upper section of the receiving vessel is therefore agitated by both the discharged reactant stream leaving the flow guides and by passage upward through the mixing means. Located at the upper portion of the receiving vessel is a conduit means which allows the removal of the emulsion from the receiving chamber, or alternatively, the chamber may be provided with a settling zone furnished for separate draw off means for the hydrocarbon and acid phases.

The acid inlet means are typically one or more conduits located in the side walls of the upper chamber of the receiving vessel to allow acid to enter the lower portion of the upper chamber. Preferably, the acid inlet means are positioned around or below the outlets of the standpipes.

The level of the acid phase will be set by the rate at which acid is fed to the vessel and, as previously mentioned, the acid flow will be set at some desired ratio to the reactant flow. The short term ratio of acid to hydrocarbon flowing into the guide conduits will depend on the elevation of the acid-emulsion interface. As the level of the acid phase rises above the outlet of the standpipe, the rate of acid aspiration will increase and vice-versa in a sort of internal level controlling mechanism. The rate of acid aspiration may also be controlled by varying the size of its flow path to regulate the resistance to its flow. The rate at which material is educted into the guide conduits at any one set of conditions is dependent on the velocity of the hydrocarbon stream. The high velocity hydrocarbon stream cannot cause the eduction of a greater amount of acid than itself and the acid of hydrocarbon ratio will therefore automatically be maintained at a ratio of less than one to one in the flow guide conduits where the initial reaction between the paraffinic and olefinic hydrocarbons occurs. The preferred ratio in the guide conduit is from 0.5:1 to 1:1 and the preferred ratio in the soak zone is in the range of from 1:1 to about 3:1 by volume. The preferred higher acid to hydrocarbon ratio in the soak zone is obtained by the contacting of the agitated emulsion with the high purity acid stream contained in the lower section of the reaction vessel to thereby allow the acid to be mixed into the emulsion. The concentration of the acid in the soak zone emulsion is ultimately set by the rate at which the acid is pumped into the reaction vessel. The acid which is not aspirated into the flow guide conduits accumulates and raises as a layer toward the upper section of the receiving vessel until it reaches a point of sufficient turbulence and agitation that it is absorbed as part of the emulsion. No sharp change from an acid continuous phase to a hydrocarbon continuous phase is likely and this point of mixing will probably be part of a general zone of acid concentration transition. If a preforated plate such as 26 is used in the vessel, the agitation in the lower section of the vessel will not be so extensive as if the guide conduits were free standing or mounted on brackets. For this reason, in an apparatus of the configuration shown in FIG. 1, the acid phase would probably be fairly well intact until the acid passed through plate 26 and came in contact with the swirling emulsion caused by the discharge of the hydrocarbons and educted acid.

The configuration presented in our apparatus provides a hydrocarbon stream having a higher superficial velocity at the point of acid contact and then keeps the emulsion intact for a preferred holding time of about 7 to 10 minutes. To obtain a higher octane number alkylate, we prefer to use a low strength acid of about 85–90% purity by weight acid with the remainder being a polymeric organic diluent and a small amount of water. This, however, results in an increased production of alkyl fluorides. To counteract this, we utilize a "time tank" or soak zone to provide an increased residence time which aids the defluorination of the alkylate product. Our invention therefore allows the maintenance of all of our preferred operating conditions in a single self-regulating unitary vessel.

Other processes known in the prior art have utilized venturi-shaped nozzles to mix the reactants or to impart kinetic energy to a circulating acid stream. In contrast, in our apparatus and process the guide conduit is freed of hydrodynamic restraints and does not function as an acid pump, but rather functions to control the conditions present during the initial reaction and contacting period. The hydrocarbon stream is initially contacted with the acid-catalyst while it is still a non-dispersed high velocity stream and this condition continues until the hydrocarbon passes through the vena-contracta of the venturi. Also in contrast to the prior art, the alkylatable hydrocarbons are initially reacted at a preferred low acid to hydrocarbon ratio and then injected into a turbulent soak zone within the same vessel having a preferred higher acid to hydrocarbon ratio.

The essential steps in the operation of an acid-catalyzed hydrocarbon alkylation process in our preferred apparatus are: (a) charging a high velocity stream of a mixture of olefinic and paraffinic hydrocarbons into a fluid flow guide conduit located within a reaction vessel maintained at reaction conditions, said hydrocarbon stream being directed into said fluid flow guide conduit means to effect aspiration of acid-catalyst contained within the reaction vessel into the guide conduit means and to cause the initial contacting of the acid-catalyst and the hydrocarbons and the initial reaction of the hydrocarbons to occur under conditions in which the hydrocarbon stream has a higher superficial linear velocity than the acid-catalyst and ratio of acid to hydrocarbon is less than one to one; (b) discharging an emulsion of acid and hydrocarbon formed in said guide conduit from the guide conduit and into an emulsion soaking zone in an upper section of the reaction vessel, said discharging being directed into a mass of emulsion retained within the upper section of the reaction vessel to cause agitation of the retained emulsion mass; (c) charging acid-catalyst to a lower section of the reaction vessel at a volumetric rate greater than that at which the mixture of olefinic and paraffin material is charged to the vessel and maintaining a layer of acid-catalyst in a lower section of the reaction vessel to supply the aspirated acid-catalyst of step (a); (d) contacting said acid-catalyst layer with said agitated retained emulsion to cause transfer of acid-catalyst from said layer into the agitated emulsion and to cause the production of an acid to hydrocarbon ratio greater than one to one in said agitated emulsion; and, (e) passing acid-catalyst emulsion from said emulsion soaking zone to a settling zone.

EXAMPLE

The purpose of this Example is to illustrate the improved results accompanying the passage of the reacting hydrocarbons into the reaction zone at a higher superficial velocity than the catalyst or catalyst-containing emulsion prior to the mixing of the acid or emulsion with the hydrocarbon feed. This Example is based on a compilation of data from an operating HF alkylation pilot plant.

A horizontal emulsion circulation tube containing a plain tee pipe fitting having an inside diameter or approximately 0.25 inches was utilized as the reactor. The tee was positioned so that a circulating acid-hydrocarbon emulsion passed through the "straight through" portion of the tee and a hydrocarbon mixture of olefins and isoparaffins was injected into the tee through its side inlet using a nozzle having a 0.02 inch inside diameter for one set of data and using the tee itself without a nozzle for another set of data. The hydrocarbon-acid emulsion was continuously recirculated under pressure through a closed loop containing the mixing tee. This turbulent closed loop was in effect a holding tank which increased the residence time of the hydrocarbon product stream. A portion of the resulting emulsion was allowed to pass into a settling zone from which acid was recycled to the reaction loop and the alkylate product was recovered, the alkylate product being allowed to bleed off through a pressure control valve. The conditions downstream of the point of mixing were maintained at the same degree of turbulence, etc., for all the tests conducted. The small diameter nozzle entered the tee through its side inlet and consisted of a piece of one-eighth inch outside diameter pipe having its end sealed. A hole, which was the actual nozzle and point of hydrocarbon discharge into the acid, was drilled perpendicular to the axis of this pipe and pointed downstream.

Approximately 25,000 cc./hour of an acid emulsion was circulated through the mixing tee. This emulsion flow rate was maintained constant for all nine tests, and the average velocity of the emulsion passing into the tee was approximately 8.9 inches per second. The hydrocarbon feed rate, when using the 0.02 inch nozzle and when using the tee itself for injecting feed into the tee, was maintained at approximately 1,500 cc./hour. In tests 1, 2 and 3, the tee itself was used as the injection nozzle for the hydrocarbon feed and the hydrocarbon feed velocity was 0.5 inches per second. For tests 4, 5, 6, 7, 8 and 9, the 0.02 inch nozzle was used for injecting the hydrocarbons into the circulating emulsion. For these 6 tests, the average hydrocarbon velocity in the tee at the point of introduction into the emulsion was about 80.9 inches per second.

Nine individual tests were performed utilizing the basic apparatus described above. The operating conditions for the nine tests varied slightly, but the overall trend indicated by the data from these tests is that the hydrocarbon feed should enter a conversion apparatus at a velocity exceeding the velocity of the emulsion. There was some variance in acid purity, temperature, contact time and the ratios of paraffin to olefin and acid to hydrocarbons during the course of the experiments. These variances may alter the overall mixed octanes of the alkylate. No corrections were made in the octane number for these variances other than for the different paraffin to olefin and acid to hydrocarbon ratios.

Figure 2:
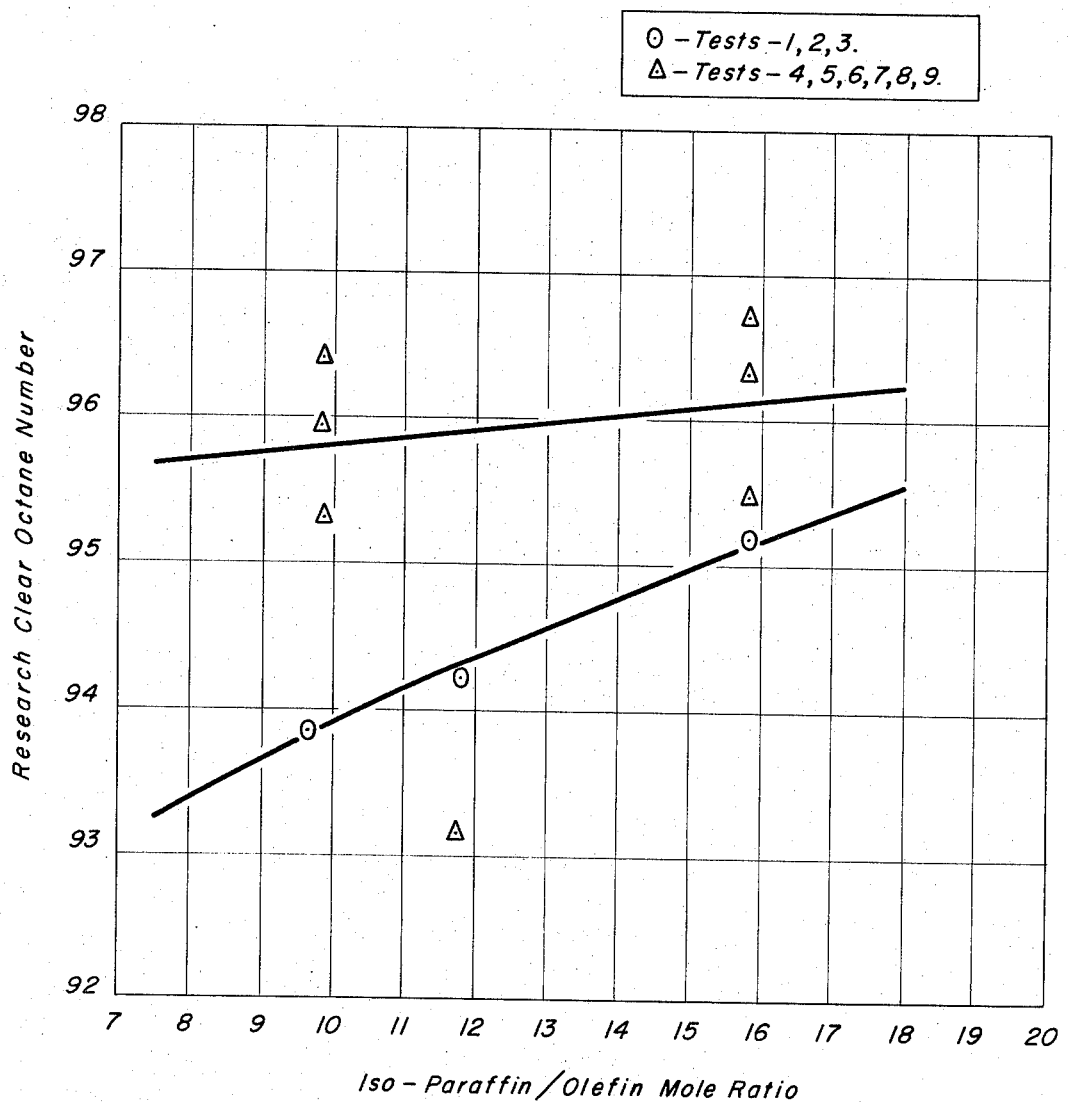
FIG. 2 presents experimental results and is discussed in the example.

The reported data from tests 1 through 9 are shown in Table I below. For tests 1, 2, and 3, the feed entered at a rate slower than the emulsion flow rate (0.5 inches per second versus 8.9 inches per second). For tests 4, 5, 6, 7, 8 and 9, the hydrocarbons feed entered the tee at a velocity substantially greater than the emulsion velocity (80.9 inches per second versus 8.9 inches per second). The research clear octane numbers for the two series of tests were plotted versus the ratio of isoparaffin to olefin in FIG. 2 attached. As can be seen from the data in Table I and from the plot of the data in FIG. 2, when the velocity of the hydrocarbon was greater than the emulsion, a noticeable trend toward higher octane numbers resulted.

The experimental apparatus was orientated in a horizontal plane and the acid-catalyst was circulated by a pump. Therefore, the nozzle of our apparatus is not utilized to impart kinetic energy to circulate the acid as in some of the prior art, or to cause a dispersion of the reactants into an acid phase heat sink. Since all fluid flow rates were maintained constant, the same high degree of turbulence was present downstream of the point of mixing in all of the test runs and the observed difference in octane number must be due to a difference in the method of the initial contacting. This difference appears to be the passage of the hydrocarbon feed into the acid-containing emulsion at a higher superficial velocity than the emulsion prior to the mixing of the emulsion and the hyrocarbon feed. A second series of runs was conducted with a nozzle having a 0.060 inch diameter opening. This resulted in octane numbers essentially the same as for the 0.020 inch diameter nozzle and is a further indication that the improvement in octane numbers is due to effects related to the higher superficial velocity of the hydrocarbon stream rather than to its absolute velocity and kinetic energy.

An exact explanation of the kinetics responsible for the improvement is not known. The prior art has attempted to shorten the mixing time or to improve the mixing through the use of nozzles or sintered materials which provide a uniform dispersion of fine hydrocarbon droplets into a bulk of acid or emulsion used as a heat sink. No matter how fine these droplets are, they are still relatively large on a molecular scale and some mixing of the reactants and acid must still be performed. These fine droplets lack the kinetic energy to promote fast mixing on their individual surfaces by maintaining high superficial velocities. The droplets may actually be moving at the same velocity as the emulsion a short distance after leaving a nozzle and therefore not exerting any shear forces on their reacting surface molecules. In contrast, our invention utilizes the flow of a relatively large nondispersed stream of fast moving hydrocarbon. A possible explanation for the improvement produced by our invention lies in the maintenance of a high kinetic energy per unit mass and of high shear forces on the surfaces of the reacting mixture until the reactants and the acid are intimately mixed and the reaction substantially completed. When confined to a small tube or flow guide, the hydrocarbon-acid interface is continually undergoing a high degree of mixing until the completion of the majority of the reaction. This mixing destroys localized 'hotspots' which could be thought of as the stagnant surface layers of prior art dispersions. Under this theory, the best alkylate possible would probably be produced by a system which could produce the impossible combination of small droplets with high kinetic energy.

Besides the improvement in a alkylate quality, another advantage of our invention, which could be utilized in situations in which the need for octane number improvement is not controlling, is the ability to lower the isoparaffin to olefin ratio because the same octane number alkylate may be produced at a lower ratio. This first of all reduces the utilities cost of pumping recycle isoparaffin from the hydrocarbon separation zone to the reaction zone and also lowers the flow rate of the emulsion. Secondly, the reduced amount of isoparaffin in the hydrocarbon product stream lowers the cost of fractionating this stream to separate out the alkylate.

TABLE I

| Test No. | 1 | 2 | 3 | 4 | 5 | 6 | 7 | 8 | 9 |
|---|---|---|---|---|---|---|---|---|---|
| Nozzle | No | No | No | Yes | Yes | Yes | Yes | Yes | Yes |
| Acid | | | | | | | | | |
| % HF | 77.7 | 78.2 | 72.6 | 78.2 | 72.4 | 78.2 | 77.5 | 75.2 | 70.9 |
| % $H_2O$ | 1.5 | 2.2 | 2.6 | 2.2 | 1.6 | 2.2 | 1.2 | 2.4 | 1.6 |
| Contactor Temp. | 90°F. | 90°F. | 91°F. | 90°F. | 91°F. | 90°F. | 91°F. | 90°F. | 90°F. |
| Contact Time, Minutes | 7.0 | 6.8 | 6.8 | 7.0 | 6.8 | 7.0 | 7.0 | 6.8 | 6.8 |
| Mole Ratios | | | | | | | | | |
| Isoparaffin/Olefin | 9.6 | 11.8 | 15.8 | 11.8 | 15.8 | 15.8 | 9.9 | 9.9 | 9.9 |
| HF/Hydrocarbon | 2.0 | 2.1 | 2.0 | 2.0 | 2.0 | 2.0 | 2.0 | 2.1 | 2.0 |
| Alkylate | | | | | | | | | |
| Research Octane | 93.8 | 94.2 | 95.2 | 93.2 | 96.7 | 96.3 | 95.9 | 95.5 | 96.4 |

We claim:

1. An apparatus for contacting a hydrocarbon stream with a mineral acid-catalyst which comprises:
   a. an enclosed receiving vessel having an upper and lower chamber;
   b. hydrocarbon inlet means located in said lower chamber of said receiving vessel;
   c. acid-catalyst inlet means located in said upper chamber of said receiving vessel;
   d. an imperforate plate across the width of said vessel, said imperforate plate dividing said vessel into said upper and lower chambers, a plurality of standpipe means connected to said imperforate plate and positioned immediately above said hydrocarbon inlet means, said standpipe means being positioned vertically within the receiving vessel and each standpipe means having a hydrocarbon outlet;
   e. a perforated plate above said imperforate plate and above the acid-catalyst inlets means and positioned across the width of said vessel, flow guide conduits located within the receiving vessel, said flow guide conduits being axially aligned above each of said standpipe means and affixed to said perforated plate, said flow guide conduits serving to promote eduction of acid-catalyst into the flow guide conduits by a high velocity hydrocarbon stream emitted from the openings in said standpipe means, and to contain and confine the hydrocarbon stream and prevent contact of a resulting acid-hydrocarbon emulsion with previously formed emulsion until the hydrocarbons and acid are thoroughly mixed and the hydrocarbons at least partially reacted; and,
   f. an emulsion outlet means located in said upper chamber of said receiving vessel.

2. The apparatus of claim 1 wherein said guide conduits have a venturi-like shape.

3. The apparatus of claim 1 wherein said lower chamber of the receiving vessel is compartmentalized by vertical walls which extend upwardly from the bottom of the vessel to said imperforate plate which separates the vessel into said lower and upper chambers.

4. The apparatus of claim 1 wherein emulsion mixing means are located in said upper chamber above the outlets of said guide conduits.

* * * * *